(12) United States Patent (10) Patent No.: US 8,638,835 B2
Wang et al. (45) Date of Patent: Jan. 28, 2014

(54) WIRELESS REPEATER IMPLEMENTING MULTI-PARAMETER GAIN MANAGEMENT

(75) Inventors: Michael Mao Wang, San Diego, CA (US); Gwendolyn Denise Barriac, Encinitas, CA (US); Dhananjay Ashok Gore, Bangalore (IN); Tao Tian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/312,533

(22) Filed: Dec. 6, 2011

(65) Prior Publication Data

US 2013/0142222 A1 Jun. 6, 2013

(51) Int. Cl.
*H04L 25/20* (2006.01)
(52) U.S. Cl.
USPC ................. 375/211; 375/345; 455/11.1
(58) Field of Classification Search
USPC ........... 375/211, 216, 295, 296, 297, 345; 455/11.1, 13.1, 13.4, 63.1, 67.11, 455/115.1, 115.3, 119, 127.1, 127.2, 455/226.2–226.4, 232.1, 234.1, 240.1, 455/250.1
See application file for complete search history.

(56) References Cited

U.S. PATENT DOCUMENTS

| | | | |
|---|---|---|---|
| 6,934,511 B1* | 8/2005 | Lovinggood et al. | 455/11.1 |
| 7,043,203 B2* | 5/2006 | Miquel et al. | 455/24 |
| 2004/0176027 A1 | 9/2004 | O'neill et al. | |
| 2006/0205342 A1* | 9/2006 | McKay et al. | 455/11.1 |
| 2010/0285734 A1* | 11/2010 | Black et al. | 455/7 |
| 2011/0312269 A1* | 12/2011 | Judd et al. | 455/11.1 |
| 2012/0113834 A1 | 5/2012 | Hunzinger | |
| 2012/0287968 A1* | 11/2012 | Gainey et al. | 375/211 |

OTHER PUBLICATIONS

International Search Report and Written Opinion—PCT/US2012/067549—ISA/EPO—Feb. 21, 2013.

* cited by examiner

*Primary Examiner* — Dac Ha
(74) *Attorney, Agent, or Firm* — Muncy, Geissler, Olds & Lowe, PLLC

(57) ABSTRACT

A wireless repeater incorporates a gain management block to implement a multi-parameter gain management algorithm. The gain management algorithm receives gain settings from at least a gain control metric for stability and output signal quality and signal headroom values associated with circuitry of the repeater. The gain management block provides secure and robust boot-up of the repeater as well as oscillation detection and prevention. Furthermore, the gain management block implements repeater stability control, output signal-to-noise level control, uplink and downlink gain balance control and compensation for device constraints.

24 Claims, 5 Drawing Sheets

WIRELESS REPEATER IMPLEMENTING MULTI-PARAMETER GAIN MANAGEMENT

BACKGROUND

1. Field

This disclosure generally relates to repeaters in wireless communication systems, and in particular, to a system and method for managing and controlling repeater gain in a wireless repeater.

2. Background

Wireless communication systems and techniques have become an important part of the way we communicate. However, providing coverage can be a significant challenge to wireless service providers. One way to extend coverage is to deploy repeaters.

In general, a repeater is a device that receives a signal, amplifies the signal, and transmits the amplified signal. FIG. 1 shows a basic diagram of a repeater 110, in the context of a cellular telephone system. Repeater 110 includes a donor antenna 115 as an example network interface to network infrastructure such as a base station 125. Repeater 110 also includes a server antenna 120 (also referred to as a "coverage antenna") as a mobile interface to mobile device 130. In operation, donor antenna 115 is in communication with base station 125, while server antenna 120 is in communication with mobile devices 130.

In repeater 110, signals from base station 125 are amplified using forward link circuitry 135, while signals from mobile device 130 are amplified using reverse link circuitry 140. Many configurations may be used for forward link circuitry 135 and reverse link circuitry 140.

There are many types of repeaters. In some repeaters, both the network and mobile interfaces are wireless; while in others, a wired network interface is used. Some repeaters receive signals with a first carrier frequency and transmit amplified signals with a second different carrier frequency, while others receive and transmit signals using the same carrier frequency. For "same frequency" repeaters, one particular challenge is managing the feedback that occurs since some of the transmitted signal can leak back to the receive circuitry and be amplified and transmitted again.

Existing repeaters manage feedback using a number of techniques; for example, the repeater is configured to provide physical isolation between the two antennae, filters are used, or other techniques may be employed.

SUMMARY

Systems, apparatuses, and methods disclosed herein allow for enhanced repeater capability. In one embodiment, a method for controlling gain in a wireless repeater includes receiving a receive signal at a first antenna of the repeater where the receive signal is a sum of a remote signal to be repeated and a feedback signal resulting from a feedback channel between the first antenna and a second antenna and the feedback channel thus forms a feedback loop between the first and second antennas; transmitting an amplified signal over the second antenna of the repeater where the amplified signal is amplified by a gain value; computing at least one gain control metric being indicative of stability and output signal quality of the repeater and generating a first gain setting value; determining one or more maximum signal headrooms associated with circuitry of the repeater and generating a second gain setting value; and determining the gain value of the amplified signal based on the first and second gain setting values where the gain value is selected to maintain the stability of the feedback loop of the repeater and to not exceed the one or more maximum signal headrooms associated with the circuitry of the repeater.

According to another embodiment of the present invention, a method for controlling gain in a wireless repeater includes receiving a receive signal at a first antenna of the repeater where the receive signal is a sum of a remote signal to be repeated and a feedback signal resulting from a feedback channel between the first antenna and a second antenna and the feedback channel thus forms a feedback loop between the first and second antennas; transmitting an amplified signal over the second antenna of the repeater where the amplified signal is amplified by a gain value; computing at least one gain control metric being indicative of stability and output signal quality of the repeater and generating a first gain setting value; and determining whether the first gain setting value indicates an increase or a decrease in a current gain value. When the first gain setting value indicates a decrease in the current gain value, the method includes setting the gain value of the repeater based on the first gain setting value. When the first gain setting value indicates an increase in the current gain value, the method includes determining one or more maximum signal headrooms associated with circuitry of the repeater, and setting the gain value of the repeater based on the first gain setting value and not to exceed the one or more maximum signal headrooms associated with the circuitry of the repeater.

According to yet another aspect of the present invention, a wireless repeater having a first antenna and a second antenna to receive a receive signal and transmit an amplified signal where the receive signal is a sum of a remote signal to be repeated and a feedback signal resulting from a feedback channel between the first antenna and the second antenna and the feedback channel thus forms a feedback loop between the first and second antennas includes a repeater circuitry and a gain management block. The repeater circuitry is configured to receive the receive signal from one of the first and second antennas, and to amplify and transmit the amplified signal over the other one of the first and second antennas where the amplified signal is amplified by a gain value. The gain management block is configured to control the gain value of the repeater based on multiple gain setting values. The gain management block is configured to compute at least one gain control metric being indicative of stability and output signal quality of the repeater and generate a first gain setting value. The gain management block is further configured to determine one or more maximum signal headrooms associated with circuitry of the repeater and generating a second gain setting value. In operation, the gain management block determines the gain value of the amplified signal based on the first and second gain setting values. The gain value is selected to maintain the stability of the feedback loop of the repeater and to not exceed the one or more maximum signal headrooms associated with the circuitry of the repeater.

According to yet another aspect of the present invention, a wireless repeater having a first antenna and a second antenna to receive a receive signal and transmit an amplified signal where the receive signal is a sum of a remote signal to be repeated and a feedback signal resulting from a feedback channel between the first antenna and the second antenna and the feedback channel thus forms a feedback loop between the first and second antennas includes a repeater circuitry and a gain management block. The repeater circuitry is configured to receive the receive signal from one of the first and second antennas, and to amplify and transmit the amplified signal over the other one of the first and second antennas where the amplified signal is amplified by a gain value. The gain management block is configured to control the gain value of the repeater based on multiple gain setting values. The gain management block is configured to compute at least one gain control metric being indicative of stability and output signal quality of the repeater and generate a first gain setting value. The gain management block is configured to determine whether the first gain setting value indicates an increase or a decrease in a current gain value. When the first gain setting value indicates a decrease in the current gain value, the gain management block is configured to set the gain value of the repeater based on the first gain setting value. When the first gain setting value indicates an increase in the current gain value, the gain management block is configured to determine one or more maximum signal headrooms associated with circuitry of the repeater, and to set the gain value of the repeater based on the first gain setting value and not to exceed the one or more maximum signal headrooms associated with the circuitry of the repeater.

DETAILED DESCRIPTION

The nature, objectives, and advantages of the disclosed method and apparatus will become more apparent to those skilled in the art after considering the following detailed description in connection with the accompanying drawings.

Prior art repeaters such as those described above may provide significant advantages for cellular telephone or similar networks. However, existing repeater configurations may not be suitable for some applications. For example, existing repeater configurations may not be suitable for indoor coverage applications (e.g., repeating signals for a residence or business environment) which may require substantially more isolation between the repeater's antennas. Moreover, in some traditional repeater implementations, the target is to achieve as high a gain as reasonable while maintaining a stable feedback loop (loop gain less than unity). However, increasing the repeater gain renders stable operation more difficult due to the increased signal leaking back into the donor antenna. In general, loop stability and minimal noise injection demands require that the signal leaking back into the donor antenna from the coverage antenna be much lower than the remote signal (the signal to be repeated). Thus, to ensure stability, a repeater's gain is traditionally limited to less than the isolation from the server antenna to the donor antenna, by some margin. When the gain of a traditional repeater exceeds its isolation, a positive feedback condition occurs resulting in oscillation. For some indoor applications, the proximity of the antennas decreases the "spatial" isolation. Hence, other kinds of isolation must be developed to maintain system stability.

Figure 1:
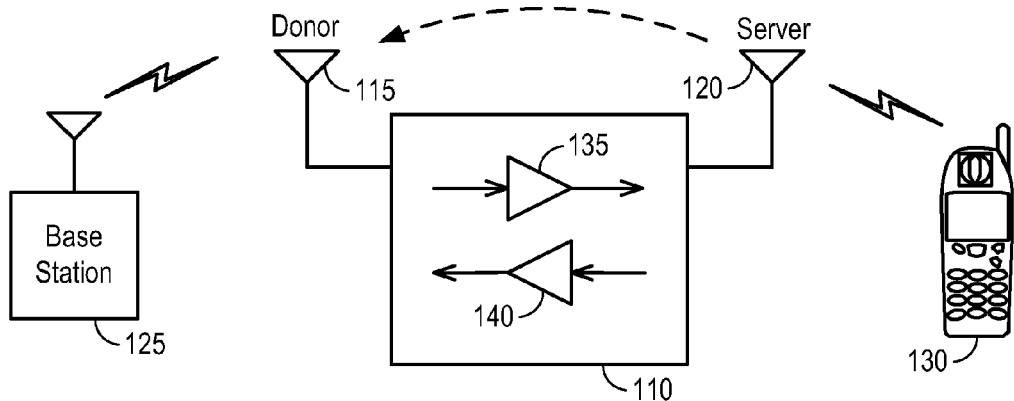
FIG. 1 is a simplified diagram of a repeater according to the prior art.
Figure 2:
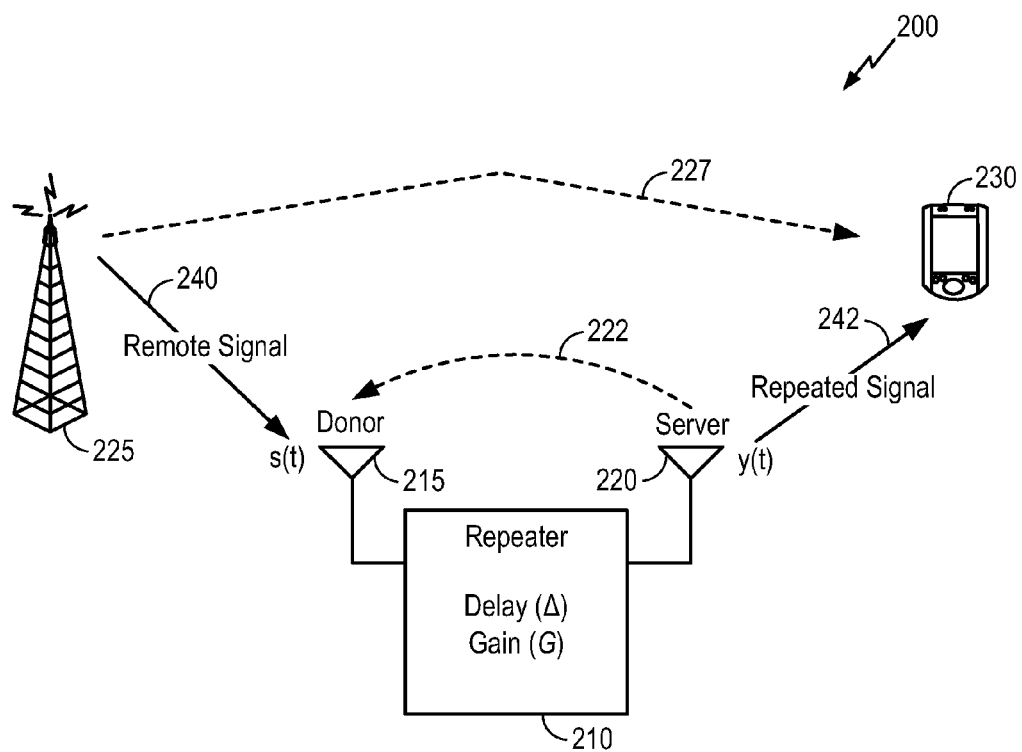
FIG. 2 shows a diagram of a repeater environment according to some embodiments of the present invention.

FIG. 2 shows a diagram of an operating environment 200 for a repeater 210 according to embodiments of the present invention. In FIG. 2, a remote signal 240 from a base station 225 is intended for a mobile device 230. A repeater, such as repeater 210, may be used in operating environment 200 if an un-repeated signal along the path 227 between base station 225 and mobile device 230 would not provide sufficient signal for effective voice and/or data communications received at mobile device 230. Repeater 210 with a gain G and a delay $\Delta$ is configured to repeat a signal received from base station 225 on a donor antenna 215 ("the receiving antenna") and amplify and transmit the repeated signal 242 to mobile device 230 using a server antenna 220 ("the transmitting antenna"). Repeater 210 includes forward link circuitry for amplifying and transmitting signals received from the base station 225 to mobile device 230 through donor antenna 215 and server antenna 220. Repeater 210 may also include reverse link circuitry for amplifying and transmitting signals from mobile device 230 back to base station 225. At repeater 210, the remote signal s(t) is received as an input signal and the remote signal s(t) is repeated as a repeated or amplified signal y(t) where $y(t)=\sqrt{G}s(t-\Delta)$. Ideally, the gain G would be large, the inherent delay $\Delta$ of the repeater would be small, the input SINR would be maintained at the output of repeater 210 (this can be of particular importance for data traffic support), and only desired carriers would be amplified.

In practice, the gain of repeater 210 is limited by the isolation between donor antenna 215 and server antenna 220. If the gain is too large, the repeater can become unstable due to signal leakage. Signal leakage refers to the phenomenon where a portion of the signal that is transmitted from one antenna (in FIG. 2, server antenna 220) is received by the other antenna (in FIG. 2, donor antenna 215), as shown by the feedback path 222 in FIG. 2. Without interference cancellation or other leakage cancellation techniques, the repeater would amplify this feedback signal, also referred to as the leakage signal, as part of its normal operation, and the amplified feedback signal would again be transmitted by server antenna 220. The repeated transmission of the amplified feedback signal due to signal leakage and high repeater gain can lead to repeater instability. Additionally, signal processing in repeater 210 has an inherent non-negligible delay $\Delta$. The output SINR of the repeater is dependent on RF non-linearities and other signal processing. Thus, the aforementioned ideal repeater operational characteristics are often not attained. Finally, in practice, the desired carriers can vary depending on the operating environment or market in which the repeater is deployed. It is not always possible to provide a repeater that amplifies only the desired carriers.

In a same-frequency repeater, the incoming signal is retransmitted on the same frequency at which it is received. In cases where high gain is desired than there is isolation in the antennas, interference cancellation is often used to increase the stability of the repeater and increase the overall gain.

In embodiments of the present invention, a wireless repeater employs interference cancellation or echo cancellation to improve the isolation between the repeaters' donor antenna ("the receiving antenna" for downlink communications) and the coverage antenna ("the transmitting antenna" for downlink communications). Interference cancellation is accomplished by actively cancelling out the transmit signal received on the repeater's own receive signal, referred to as the "leakage signal" or the "feedback signal." In some cases, interference cancellation is carried out in baseband, that is in the digital domain. Baseband interference cancellation is accomplished by storing a digital reference of the signal to be transmitted and using this digital reference to estimate the feedback channel. The feedback channel estimate is then used to estimate the feedback signal so as to actively cancel the leakage signal.

More specifically, the echo cancellation process involves estimating the feedback channel using the transmit signal as a reference signal, convolving the feedback channel estimate with the transmit signal to generate a feedback signal estimate, and applying the feedback signal estimate to cancel the undesired feedback signal in the receive signal. Effective echo cancellation requires very accurate channel estimation of the leakage channel. In general, the more accurate the channel estimate, the higher the cancellation and hence the higher the effective isolation. Herein, "interference cancellation" or "echo cancellation" refers to techniques that reduce or eliminate the amount of leakage signal between repeater antennas; that is, "interference cancellation" refers to partial or complete cancellation of the leakage signal.

Repeater Gain Control

A repeater should be maintained unconditionally stable. In traditional repeater implementations, the target is to achieve as high a gain as possible while ensuring that the feedback loop remains stable (loop gain less than unity). High gain level provides maximum possible coverage area. However, loop stability demands require that the signal leaking back into the donor antenna from the coverage antenna be much lower than the remote signal (the signal to be repeated). The repeater feedback loop (or "control loop") refers to the feedback loop inherently formed in the repeater between the transmitting antenna and the receiving antenna. The gain of the feedback loop ("the loop gain") needs to be measured and controlled to maintain loop stability. Loop gain refers to the gain of a signal or the ratio of the power of a signal transmitted through a feedback loop as compared to the original signal. Besides feedback loop stability, repeater gain is also affected by other factors include device constraints. For instance, the repeater gain may be limited by the headrooms of the analog-to-digital converter (ADC) circuit and the digital-to-analog converter (DAC) circuit of the repeater. The repeater gain may also be affected by uplink and downlink gain imbalance of the repeater.

The gain of the repeater may be increased significantly through the use of interference cancellation techniques. With these techniques, the signal leaking back from the coverage antenna into the donor antenna is treated as interference and cancelled using baseband techniques, thereby allowing a higher repeater gain to be used. Any uncancelled feedback signal in the receive signal acts as noise added to the original remote signal and limits the output signal-to-noise ratio (SNR). Higher repeater gain is desirable since it increases the coverage area of the repeater. However, repeater stability must be unconditionally maintained. To keep repeater operation stable, control of the loop gain of the repeater is important.

Repeater Gain Management

According to one aspect of the present invention, an interference cancellation repeater incorporates a gain management block to implement a multi-parameter gain management algorithm. The gain management block ensures secure and robust boot-up of the repeater as well as oscillation detection and prevention. More specifically, the gain management block implements repeater stability control, output signal-to-noise level control, uplink and downlink gain balance control and compensation for device constraints, such as the repeater's analog-to-digital converter (ADC) and the digital-to-analog converter (DAC) dynamic range and non-linearities.

Repeater Architecture

Figure 3:
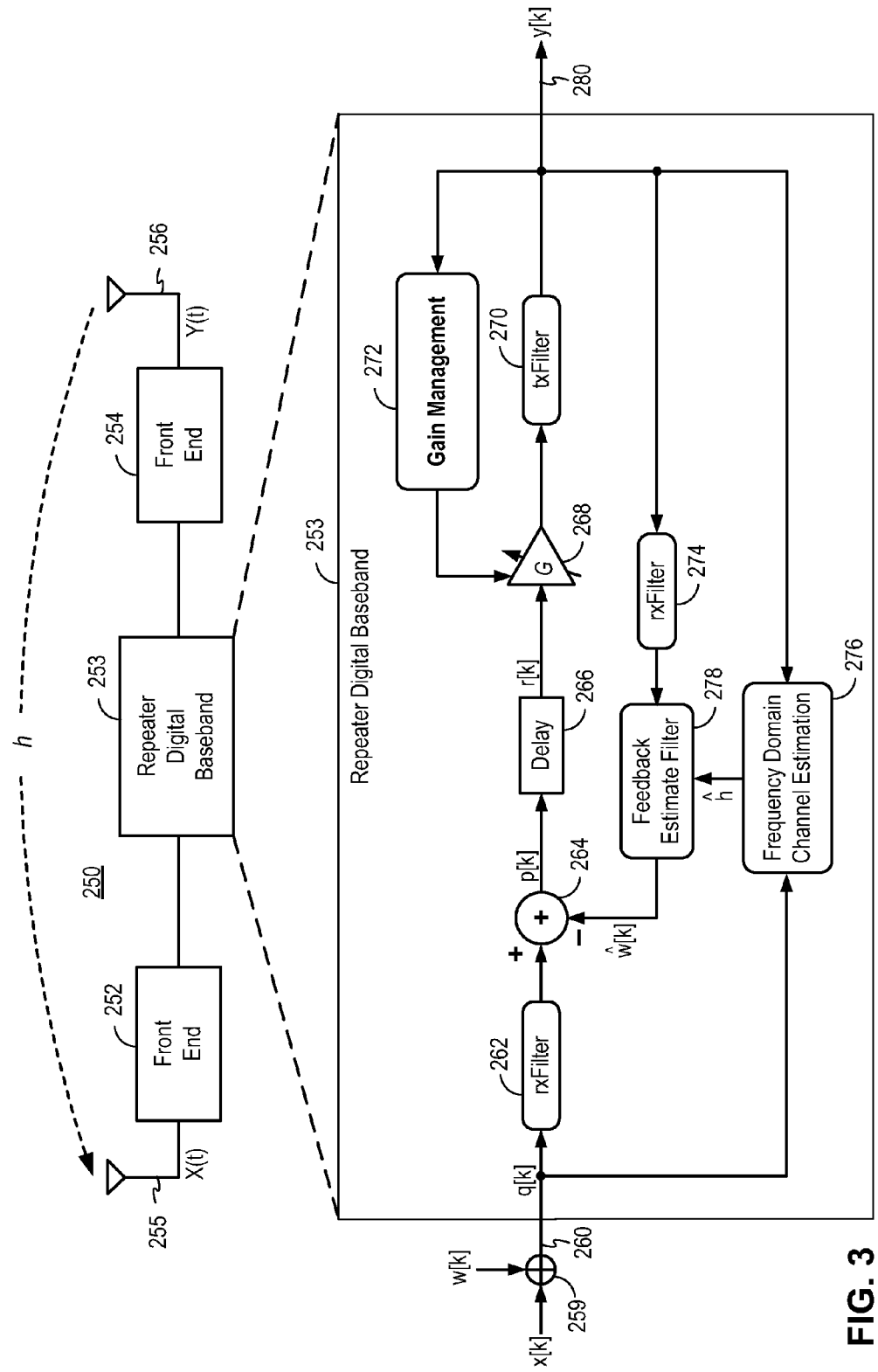
FIG. 3 is a schematic diagram of an interference cancellation repeater incorporating a gain management block implementing a gain management algorithm according to one embodiment of the present invention.

FIG. 3 is a schematic diagram of an interference cancellation repeater incorporating a gain management block implementing a gain management algorithm according to one embodiment of the present invention. Referring to FIG. 3, an interference cancellation repeater 250 receives a remote signal X(t) on a donor antenna 255 ("the receiving antenna") to be repeated and generates an output signal Y(t) to be transmitted on a server antenna 256 ("the transmitting antenna"). The repeater 250 includes a first front-end circuit 252 coupled to the donor antenna 255, a second front-end circuit 254 coupled to the server antenna 256, and a repeater digital baseband block 253 coupled between the first and second front-end circuits.

The first and second front-end circuits 252, 254 incorporate digital and analog front-end processing circuitry for implementing the receive and transmit functions of the wireless repeater. In general, the front-end circuits include receive and transmit circuits for receiving and transmitting analog signals. The receive and transmit circuits include digital signal processors for converting analog signals into digital signals and converting digital signals to analog signals. In one embodiment, the first and second front-end circuits 252, 254 each includes variable gain amplifiers, power amplifiers, filters, mixers, drivers, analog-to-digital converters (ADC) and digital-to-analog converters (DAC). The specific implementation of the repeater front-end circuits 252, 254 is not critical to the practice of the present invention and any receiver/transmitter front-end processing circuitry, presently known or to be developed, can be applied in the wireless repeater of the present invention.

In operation, signal leakage from the transmitting antenna 256 back to the receiving antenna 255 of the repeater 250 causes part of the output signal Y(t) to be leaked back through a feedback channel h and added to the remote signal X(t) before the signal is received by the repeater. Thus, the repeater 250 actually receives a composite receive signal being the sum of the remote signal X(t) and the feedback signal where the feedback signal is basically an attenuated version of the output signal Y(t).

The repeater 250 includes the repeater digital baseband block 253 where channel estimation, baseband echo cancellation, and gain control operations are implemented. The repeater digital baseband block 253 receives a digital receive signal q[k] and generates an output signal y[k], also referred to as a digital transmit signal, being the signal to be transmitted. The digital receive signal q[k] is a composite receive signal being the sum of the remote signal x[k] to be repeated and a feedback signal w[k] resulting from the feedback channel between the donor antenna 255 and the transmitting antenna 256, as described above. In FIG. 3, the digital receive signal q[k] on input node 260 is represented as being the sum of the remote signal x[k] and the feedback signal w[k] through a summer 259. Summer 259 in FIG. 3, to sum signals x[k] and w[k], is symbolic only to illustrate the signal components of the digital receive signal q[k] and does not represent an actual signal summer in the repeater 250. The repeater 250, being an interference cancellation repeater, operates to estimate the feedback signal w[k] in order to cancel out the undesired feedback signal component in the receive signal.

In the repeater digital baseband block 253, the digital receive signal q[k] ("the input signal") on input node 260 is coupled to a receive filter 262 ("rxFilter"). In one embodiment, receive filter 262 is a tunable, digital baseband receive filter to enable appropriate filtering of the received signal waveform. The filtered receive signal is coupled to an echo canceller implementing echo cancellation. The echo canceller may implement time domain or frequency domain echo cancellation. In the present embodiment, the echo canceller includes a summer 264 which operates to subtract a feedback signal estimate ŵ[k] from the filtered receive signal. As long as the feedback signal estimate is accurate, all or some of the undesired feedback signal is removed from the digital receive signal and echo cancellation is realized.

The post cancellation signal p[k], also referred to as the echo cancelled signal, is coupled through a delay element 266 having a delay D1. The delay element 266 introduces a sufficient amount of delay to de-correlate the echo cancelled signal from the desired remote signal x[k]. The delayed echo cancelled signal r[k] is coupled to a variable gain stage 268 providing a variable gain of G. The amplified echo cancelled signal is coupled to a transmit filter 270 ("txFilter") to generate the digital transmit signal y[k] on an output node 280. In one embodiment, the transmit filter 270 is a tunable, digital baseband transmit filter to enable appropriate filtering of the transmit waveform. The output signal y[k] from the repeater digital baseband block 253 is coupled to the second front-end circuit 254 to be converted into analog signals and transmitted onto transmitting antenna 256 as the final output signal Y(t).

In FIG. 3, only the forward link circuitry of repeater 250 for amplifying signals received on donor antenna 255 and transmitting signals on server antenna 256 is shown. The reverse link circuitry for transmission in the reverse direction (receiving on server antenna 256 and transmitting on donor antenna 255) is omitted for simplicity. It is understood that repeater 250 may contain both forward link and reverse link circuitry to enable transmissions in both the forward and reverse link directions. Duplexers may be connected to antennas 255 and 256 to facility bi-directional (duplex) communication.

To implement echo cancellation, the repeater digital baseband block 253 includes a channel estimation block 276 which operates to estimate the feedback channel h, and generate a feedback channel estimate ĥ. The echo canceller in the repeater digital baseband block 253 further includes a feedback signal estimate computation block (or "feedback estimate filter") 278 which uses the feedback channel estimate ĥ from the channel estimation block 276 to compute the feedback signal estimate ŵ[k]. In the present embodiment, the reference signal used for channel estimation and feedback signal estimation is the digital transmit signal y[k]. The reference signal for feedback signal estimation is coupled through a receive filter 274 before being used by the feedback signal estimate block 278 to compute the feedback signal estimate. In this manner, the feedback signal estimate incorporates the same characteristics of the receive filter.

In one embodiment, the channel estimation block 276 employs time domain channel estimation using the digital transmit signal y[k] as the reference signal. The feedback channel estimate ĥ as thus computed is coupled to the feedback signal estimate block 278. Feedback signal estimate block 278 generate the feedback signal estimate ŵ[k] using the feedback channel estimate ĥ and the reference signal which passed through the receive filter 274. The feedback signal estimate ŵ[k] is coupled to summer 264 to be subtracted from the filtered receive signal to realize echo cancellation of the receive signal. Accordingly, the repeater 250 increases the effective isolation between the donor antenna and the server antenna through baseband interference cancellation. With accurate baseband echo cancellation, the repeater 250 is capable of being operated at a high gain level as compared to conventional repeater devices.

According to embodiments of the present invention, the repeater digital baseband block 253 incorporates a gain management block 272 for controlling the gain value G provided by the variable gain stage 268. In the present embodiment, the gain management block 272 implements digital gain control using the digital transmit signal y[k] as the reference signal and using a multi-parameter gain management algorithm. The gain management block 272 controls the repeater gain in order to maintain operational stability, to balance uplink and downlink gains, to mitigate uplink noise contributions and to account for device constraints of the repeater. The operation of the gain management block 272 in determining and controlling the gain of the repeater will be described with more detail below.

Gain Management Algorithm

Figure 4:
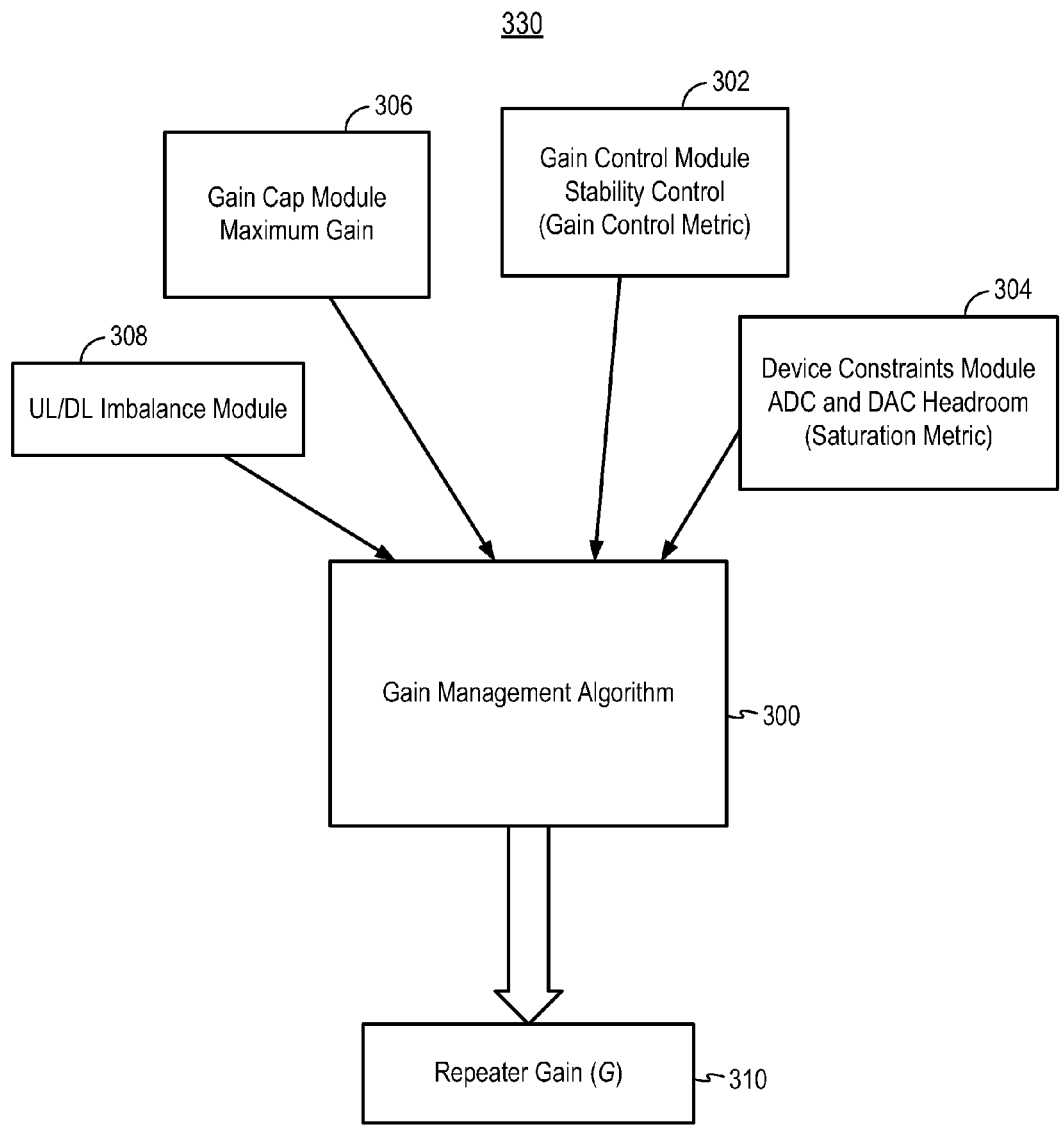
FIG. 4 illustrates the control parameter modules and the gain control algorithm forming the gain management block according to one embodiment of the present invention.

According to embodiments of the present invention, a gain management algorithm implemented in the gain management block of an interference cancellation repeater operates to control the gain of the repeater based on multiple control parameters. FIG. 4 illustrates the control parameter modules and the gain control algorithm forming the gain management block according to one embodiment of the present invention. Referring to FIG. 4, the gain management block 330 includes a gain management algorithm 300 and one or more gain control parameter modules 302-308 generating desired gain settings based on respective control parameters. A repeater, such as repeater 250 of FIG. 3, executes the gain management algorithm 300 to generate a repeater gain value G 310, which can be provided to the variable gain stage of the repeater to set the gain for the repeater.

In the present embodiment, the gain management algorithm 300 controls the gain of the repeater based on four control parameters. The four control parameters measure different aspect of the repeater operation and generate gain settings which are provided to the gain management algorithm. The gain management algorithm operate on the gain setting information provided by the control parameter modules to determine the final desired repeater gain value G 310.

First, the gain management algorithm 300 receives a first gain setting generated by a gain control module 302 for maintaining repeater stability and also for controlling the output signal-to-noise ratio (SNR) of the repeater. More specifically, the gain control module 302 operates on one or more gain control metrics to determine the desired gain setting for maintaining repeater stability and for optimizing output SNR.

In one embodiment, the gain control module 302 incorporates a gain control metric generator that computes one or more gain control metrics to estimate the loop gain of the repeater and generates a desired gain setting for maintaining stability and ensuring good output signal quality. Systems and methods for controlling repeater gain using a gain control metric and systems and methods for gain control metric computation are described in the following co-pending and commonly assigned U.S. patent applications: application Ser. No. 12/722,722, entitled "Multi-Metric Gain Control For Wireless Repeater," filed on Mar. 12, 2010; application Ser. No. 12/722,730, entitled "Stability Indicator For A Wireless Repeater," filed on Mar. 12, 2010; application Ser. No. 12/722,733, entitled "Gain Control Metric Computation In A Wireless Repeater," filed on Mar. 12, 2010; application Ser. No. 12/722,749, entitled "Gain Adjustment Stepping Control In A Wireless Repeater," filed on Mar. 12, 2010; application Ser. No. 12/722,760, entitled "Gain Control Metric Pruning In A Wireless Repeater," filed on Mar. 12, 2010; and application Ser. No. 12/722,694, entitled "Simplified Gain Control Metric," filed on Mar. 12, 2010. The aforementioned U.S. patent applications are incorporated herein by reference in their entireties.

More specifically, in some embodiments, the gain control metric may be optimized for estimation accuracy and complexity through down-sampling of the input to the gain control metric generator and linear or nonlinear filtering at the output of the gain control metric generator to improve the metric performance, as measured by low estimation bias and variance. In other embodiments, the gain control metric, being an indicator of system stability, may be monitored continuously and the gain of the repeater is adjusted up and down to output as high a gain as possible while at the same time repeater stability and required output SINR are maintained by maintaining the gain control metric to a predetermined level. The gain control module 302 generates the first gain setting which is provided to the gain management algorithm 300 to determine the desired repeater gain in conjunction with the other control parameters.

Second, the gain management algorithm 300 receives a second gain setting generated by a device constraints module 304 for setting the repeater gain in accordance with the constraints imposed by the devices of the repeater. In one embodiment, the device constraints module 304 operates to determine the amount of available ADC headroom and DAC headroom and generate the second gain setting to avoid saturation of the repeater input and output signals at the ADC and DAC. More specifically, in one embodiment, the device constraints module 304 receives information relating to the power of the incoming remote signal. The device constraints module 304 then determines the maximum headrooms for the ADC and the DAC in the front-end circuits of the repeater to avoid saturation of the repeater input and output signals. The device constraints module 304 operates on a saturation metric which uses the post cancellation signal power to determine the amount of available signal headroom. The device constraints module 304 generates the second gain setting including the headroom information for the gain management algorithm to set the repeater gain so that there is always a sufficient amount of headroom at the ADC and the DAC to avoid saturation.

Third, the gain management algorithm 300 receives a third gain setting generated by a gain cap module 306 for setting a maximum gain value for the repeater. The maximum gain value can be configured by the user to limit the repeater to a predetermined maximum gain value based on various considerations.

Fourth, the gain management algorithm 300 receives a fourth gain setting generated by a UL/DL imbalance module 308 for balancing the gain between the uplink transmission and the downlink transmissions. Imbalance between the gain of the uplink transmissions and the downlink transmissions is undesirable. The UL/DL imbalance module 308 measures the gain difference between the uplink and downlink transmission and generates the fourth gain setting to correct for uplink and downlink gain imbalance.

The gain management algorithm 300 receives all of the gain settings from gain control parameter modules 302 to 308 and generates a final repeater gain value G for the repeater.

Figure 5:
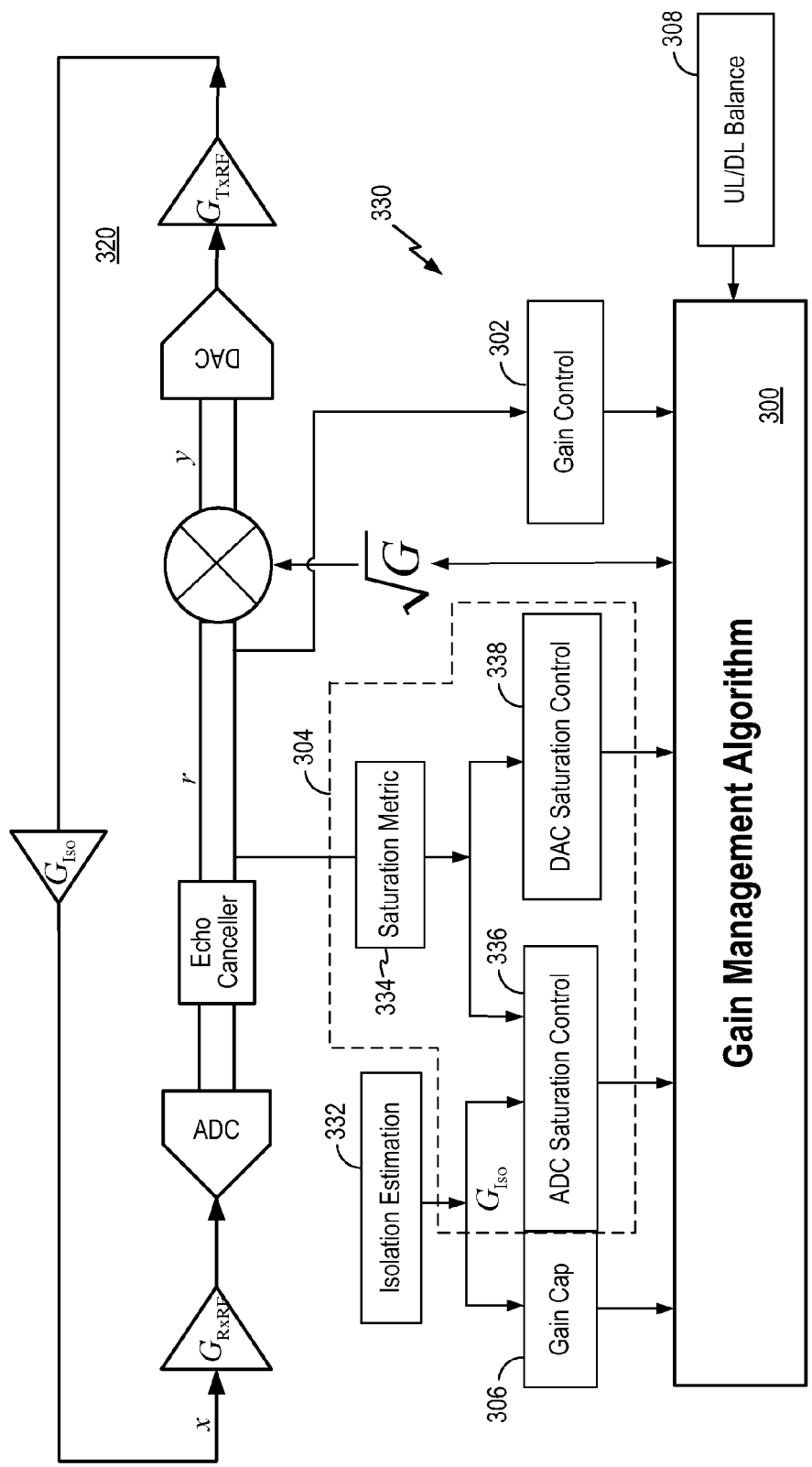
FIG. 5 illustrates the functional implementation of the gain management block in an interference cancellation repeater according to one embodiment of the present invention.

FIG. 5 illustrates the functional implementation of the gain management block in an interference cancellation repeater according to one embodiment of the present invention. FIG. 5 is provided to illustrate the functional components forming the feedback loop of the interference cancellation repeater 320 and is not intended to depict the physical construction of the repeater. Also, FIG. 5 is provided to illustrate the functional relationship between the elements of the repeater 320 and the control parameter modules of the gain management block 330. FIG. 5 is not intended to depict actual physical connections of the gain management block 330 to the repeater 320.

Referring to FIG. 5, an input signal x received on an antenna of the interference cancellation repeater 320 is first amplified by the gain ($G_{RxRF}$) at the RF receive circuit. Then, the input signal is digitized by the ADC, and echo cancellation is performed by the echo canceller. An echo-cancelled signal r is generated. The echo-cancelled signal r is then amplified by a variable gain stage receiving a gain value G from the gain management algorithm 300. The amplified signal y is provided to a DAC to be converted to an analog signal. The analog signal is amplified by the gain ($G_{TxRF}$) at the RF transmit circuit before transmission on an antenna of the repeater. A feedback channel exists between the two antennas of the repeater 320 where signal leakage over the feedback channel forms the feedback loop of the repeater system. The feedback channel is characterized by an antenna isolation, denoted as a gain $G_{Iso}$, indicative of the isolation between the two antennas of the repeater.

A gain management block 330 implemented in the repeater 320 controls the gain G of the repeater. The gain management block 330 includes the gain management algorithm 300 receiving gain settings from multiple control parameters. The gain management block 330 receives the first gain setting from the gain control module 302. Gain control module 302 uses the echo-cancelled signal r as a reference signal and computes a desired gain value using one or more gain control metrics. The gain management algorithm 300 also receives the fourth gain setting from the UL/DL Imbalance module 308 which measures the gain difference between the uplink and downlink transmissions.

An isolation estimation module 332 determines the antenna isolation $G_{Iso}$ by estimating the gain of the feedback channel between the two antennas of the repeater. The antenna isolation is then provided to the gain cap module 306 to determine the maximum gain value for the repeater. In embodiments of the present invention, the maximum gain value, or gain cap ($G_{Cap}$), of the digital gain is given as a predetermined gain value above the antenna isolation. That is: $G_{Cap}=abs(G_{Iso})+k$ dB$-G_{RxRF}-G_{TxRF}$, where $G_{RxRF}$ and $G_{TxRF}$ denote the RF gain of the receiver and transmitter circuit. In one embodiment, the gain cap is given as 30 dB above the antenna isolation, that is, $G_{Cap}=abs(G_{Iso})+30$ dB$-G_{RxRF}-G_{TxRF}$. The gain cap module 306 provides the maximum gain value (or the gain cap) to the gain management algorithm 300 to determine the final repeater gain G. In one embodiment, a maximum gain headroom value is determined based on the gain cap.

The antenna isolation is also provided to the device constraints module 304 to compute the ADC headroom availability. The device constraints module 304 computes a saturation metric 334 using the echo-cancelled signal r. In one embodiment, the saturation metric S (in linear) is given as:

$$S = \frac{1}{L}\sum_{i=1}^{L} |r_i|^2.$$

The saturation metric S is then provided to the ADC saturation control module 336 to determine the ADC headroom availability and also provided to the DAC saturation control module 338 to determine the DAC headroom availability. More specifically, the ADC headroom availability is evaluated by the condition:

$$S+G+G_{FB}<T_{ADC},$$

where G denotes the repeater gain, $G_{FB}$ denotes the gain of the repeater feedback loop which is given as: $G_{FB}=G_{TxRF}+G_{Iso}+G_{RxRF}$, and $T_{ADC}$ denotes the conversion threshold of the ADC. In other words, the ADC headroom requirement dictates that the sum of the saturation metric (S) and the gain of the repeater (G) and the gain of the feedback loop ($G_{FB}$) has to be less than the conversion threshold of the ADC. In the above equation, all the elements are given as dB values.

The DAC headroom availability is evaluated by the condition:

$$S+G<T_{DAC},$$

where G denotes the repeater gain, and $T_{DAC}$ denotes the conversion threshold of the DAC. In other words, the DAC headroom requirement dictates that the sum of the saturation metric (S) and the gain of the repeater (G) should be less than the conversion threshold of the DAC. In the above equation, all the elements are given as dB values.

The device constraints module 304 uses the aforementioned conditions to generate ADC and DAC headroom information for the gain management algorithm 300 to enable the algorithm to determine the final repeater gain G in conjunction with other control parameters.

In embodiments of the present invention, the gain management algorithm 300 determines a repeater gain headroom value ($\Delta G_{Headroom}$) that can be used for the repeater 320. The repeater gain headroom $\Delta G_{Headroom}$ refers to the maximum gain above the current gain that the repeater can increase to. In one embodiment, the gain management algorithm 300 determines the repeater gain headroom $\Delta G_{Headroom}$ by taking the minimum of the ADC headroom, the DAC headroom and the gain cap headroom. More specifically, in one embodiment, the repeater gain headroom $\Delta G_{Headroom}$ is given as:

$$\Delta G_{Headroom}=\min\{\Delta G_{ADC},\Delta G_{DAC},\Delta G_{Cap}\},$$

where $\Delta G_{ADC}$ denotes the ADC headroom, $\Delta G_{DAC}$ denotes the DAC headroom, and $\Delta G_{Cap}$ denotes the gain cap headroom, which are given as:

$$\Delta G_{ADC}=T_{ADC}-(G+G_{FB})-S,$$

$$\Delta G_{DAC}=T_{DAC}-G-S, \text{ and}$$

$$\Delta G_{Cap}=G_{Cap}-G.$$

Accordingly, the gain management algorithm 300 uses the ADC headroom, the DAC headroom and the gain cap headroom information to determine the final repeater gain based on the allowance of the repeater gain headroom $\Delta G_{Headroom}$. The final repeater gain is selected so that the repeater gain headroom is non-negative.

Figure 6:
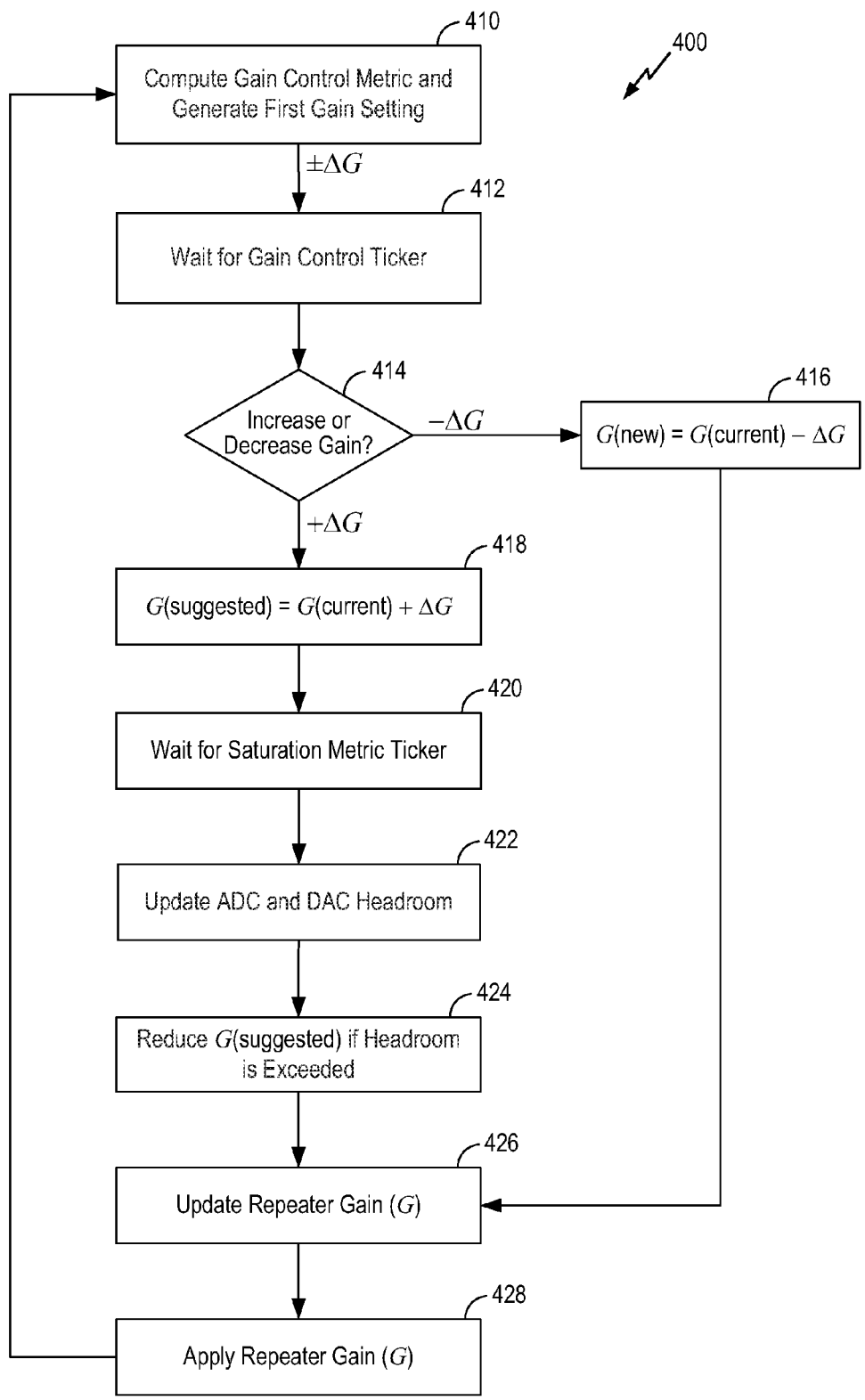
FIG. 6 is a flowchart illustrating a gain management method implemented by the gain management block according to one embodiment of the present invention.

With the control parameter modules generating gain setting information for the gain management algorithm, the gain management block generates the final repeater gain value using a gain management method taking into consideration the gain settings provided by the control parameter modules. FIG. 6 is a flowchart illustrating a gain management method implemented by the gain management block according to one embodiment of the present invention. The operation of the gain management block will be explained with reference to the block diagram of FIG. 4.

Referring to FIG. 6, a gain management method 400 starts by computing one or more gain control metrics at the gain control module 302 which generates the first gain setting value (step 410). The gain control metrics are computed to maintain stability of the repeater. The first gain setting is a gain adjustment value $\Delta G$ indicating whether the repeater gain should be increased or decreased. In the present description, a positive gain adjustment value $+\Delta G$ denotes a gain increase is desired while a negative gain adjustment value $-\Delta G$ denotes a gain reduction is desired.

After the gain control module 302 generates the gain adjustment value $\pm\Delta G$, the gain management algorithm 300 waits for a gain control ticker indicating the end of a gain control metric computation cycle (step 412). In one embodiment, the gain control ticker is a fast ticker generated for N number of samples at a given frequency (e.g. 32×8 samples at 40 MHz). In another embodiment, the gain control ticker is a slow ticker generated for M number of samples at a given frequency (e.g. 4096×8 samples at 40 MHz). When the gain control ticker is received, method 400 determines whether the gain adjustment value $\pm\Delta G$ from the gain control metric(s) indicates an increase or decrease in the repeater gain (step 414).

When the gain management algorithm 300 receives a gain reduction request from the gain control module, that is, a negative gain adjustment value $-\Delta G$, the gain management algorithm 300 reduces the repeater gain immediately for stability control. The new repeater gain G(new) is computed as the current gain G(current) minus the gain adjustment value $\Delta G$ (step 416). The repeater gain G is updated with the new repeater gain (step 426) and the gain management block 330 applies the repeater gain G(new) to the variable gain stage of the repeater (step 428). The gain of the repeater is adjusted accordingly. Method 400 repeats at step 410 where the gain control module 302 continues to compute the gain control metrics and generate a gain adjustment value.

On the other hand, when the gain management algorithm 300 receives a gain increase request from the gain control module (step 414), that is, a positive gain adjustment value $+\Delta G$, the gain management algorithm 300 does not apply the gain increase immediately. Instead, method 400 waits until the next saturation metric is computed. More specifically, a suggested repeater gain G(suggested) is computed as the current gain G(current) plus the gain adjustment value $\Delta G$ (step 418). Then, method 400 waits for a saturation metric ticker indicating the end of a saturation metric computation cycle (step 420). In one embodiment, the saturation metric ticker is generated for Q number of samples at a given frequency (e.g. 64 samples at 40 MHz).

When the saturation metric ticker is received, the ADC headroom value and the DAC headroom value are updated (step 422) using the suggested repeater gain G(suggested). Then, the gain management algorithm 300 determines if the suggested repeater gain value G(suggested) computed at step 418 exceeds the repeater headroom level (step 424). The suggested repeater gain value G(suggested) is reduced if the gain increase exceeds the repeater headroom level requirement. More specifically, in one embodiment, the repeater headroom is determined as the minimum of the ADC headroom, the DAC headroom, and the gain cap headroom, where the ADC headroom, the DAC headroom, and the gain cap headroom are computed using the suggested gain value G(suggested). If the suggested repeater gain value G(suggested) exceeds the repeater headroom, then the repeater gain value G is reduced at step 424 to meet the headroom requirement. Accordingly, any gain increase request from the gain control module is made but only to the extent that meets the repeater headroom limit. In one embodiment, a new repeater gain G(new) is computed as follows. If $\Delta G_{Headroom}$ is less than zero, then the new repeater gain G(new)=G(suggested)+$\Delta G_{Headroom}$. If $\Delta G_{Headroom}$ is equal to or greater than zero, then the new repeater gain G(new)=G(suggested).

Then, the repeater gain G is updated with the new repeater gain G(new) (step 426) and the gain management block 330 applies the new repeater gain G to the variable gain stage of the repeater (step 428). The gain of the repeater is adjusted accordingly. Method 400 repeats at step 410 where the gain control module 302 continues to compute the gain control metrics and generate a gain adjustment value.

In an alternate embodiment, method 400 further includes adjusting the repeater gain G to balance the gain between the uplink and downlink transmissions.

In embodiments of the present invention, gain management method 400 updates the repeater gain as fast as the computation of the saturation metric, as indicated by the saturation metric ticker. The gain control ticker indicating the computation of the gain control metrics may be aligned with the saturation metric ticker or may be faster or slower than the generation of the saturation metric.

The gain management block 330 implementing the gain management method 400 to control the gain of the repeater provides many advantages. First, the gain management block ensures that the repeater can be operated with robust boot-up. Second, the gain management block prevents operational instability and oscillation at the repeater. Accordingly, repeater stability and output SNR control are ensured. Third, the uplink and downlink gains are balanced. Lastly, the gain management block takes into consideration of device constraints to enhance gain control operations.

The communication system in which the repeater of the present invention can be deployed includes various wireless communication networks based on infrared, radio, and/or microwave technology. Such networks can include, for example, a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The systems and techniques described herein may also be used for any combination of WWAN, WLAN and/or WPAN.

Those skilled in the art will understand that information and signals may be represented using any of a variety of different technologies and techniques. For example: data, information, signals, bits, symbols, chips, instructions, and commands may be referenced throughout the above description. These may be represented by voltages, currents, electromagnetic waves, magnetic fields or particles, optical fields or particles, or any combination thereof.

In one or more of the above-described embodiments, the functions and processes described may be implemented in hardware, software, firmware, or any combination thereof. If implemented in software, the functions may be stored on or transmitted over as one or more instructions or code on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The term "control logic" used herein applies to software (in which functionality is implemented by instructions stored on a machine-readable medium to be executed using a processor), hardware (in which functionality is implemented using circuitry (such as logic gates), where the circuitry is configured to provide particular output for particular input, and firmware (in which functionality is implemented using re-programmable circuitry), and also applies to combinations of one or more of software, hardware, and firmware.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory of mobile station or a repeater, and executed by a processor, for example the microprocessor of modem. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. "Computer readable medium," "storage medium" and the like do not refer to transitory propagating signals.

Also, computer instructions/code may be transmitted via signals over physical transmission media from a transmitter to a receiver. For example, if the software is transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

Moreover, the previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the features shown herein but is to be accorded the widest scope consistent with the principles and novel features disclosed herein.

What is claimed is:

1. A method for controlling gain in a wireless repeater, the method comprising:

receiving a receive signal at a first antenna of the wireless repeater, the receive signal being a sum of a remote signal to be repeated and a feedback signal resulting from a feedback channel between the first antenna and a second antenna, the feedback channel thus forming a feedback loop between the first and second antennas;

transmitting an amplified signal over the second antenna of the wireless repeater, the amplified signal being amplified by a gain value;

computing at least one gain control metric being indicative of stability and output signal quality of the wireless repeater and generating a first gain setting value;

determining one or more maximum signal headrooms associated with circuitry of the wireless repeater and generating a second gain setting value; and determining the gain value of the amplified signal based on the first and second gain setting values, the gain value being selected to maintain the stability of the feedback loop of the wireless repeater and to not exceed the one or more maximum signal headrooms associated with the circuitry of the wireless repeater.

2. The method of claim 1, wherein determining one or more maximum signal headrooms associated with circuitry of the wireless repeater and generating a second gain setting value comprises:

determining a first maximum signal headroom associated with an analog-to-digital converter of the wireless repeater;

determining a second maximum signal headroom associated with a digital-to-analog converter of the wireless repeater; and generating the second gain setting value indicative of the first and second maximum signal headroom values.

3. The method of claim 2, wherein determining one or more maximum signal headrooms associated with circuitry of the wireless repeater and generating a second gain setting value further comprises:

providing a maximum gain value for the wireless repeater;

assessing a maximum gain headroom based on the maximum gain value;

setting a repeater headroom value as a minimum value of the maximum gain headroom, the first maximum signal headroom and the second maximum signal headroom; and setting the second gain setting value such that the repeater headroom value is non-negative.

4. The method of claim 3, wherein determining the gain value of the amplified signal based on the first and second gain setting values comprises:

determining the gain value based on the first and second gain setting values to maintain the stability of the feedback loop of the wireless repeater and to not exceed the repeater headroom value.

5. The method of claim 1, further comprising:

determining a gain difference between an uplink transmission and a downlink transmission of the wireless repeater;

generating a third gain setting value indicative of the gain difference; and determining the gain value of the amplified signal based on the first, second, and third gain setting values, the gain value being selected to maintain the stability of the feedback loop of the wireless repeater, to not exceed the one or more maximum signal headrooms associated with the circuitry of the wireless repeater, and to maintain uplink and downlink transmission balance.

6. A computer readable medium having stored thereon computer executable instructions for performing at least the following acts:

receiving a receive signal at an antenna of a repeater;

generating an amplified signal, the amplified signal being amplified by a gain value;

computing at least one gain control metric being indicative of stability and output signal quality of the repeater and generating a first gain setting value;

determining one or more maximum signal headrooms associated with circuitry of the repeater and generating a second gain setting value; and determining the gain value of the amplified signal based on the first and second gain setting values, the gain value being selected to maintain the stability of a feedback loop of the repeater and to not exceed the one or more maximum signal headrooms associated with the circuitry of the repeater.

7. A method for controlling gain in a wireless repeater, the method comprising:

receiving a receive signal at a first antenna of the wireless repeater, the receive signal being a sum of a remote signal to be repeated and a feedback signal resulting from a feedback channel between the first antenna and a second antenna, the feedback channel thus forming a feedback loop between the first and second antennas;

transmitting an amplified signal over the second antenna of the wireless repeater, the amplified signal being amplified by a gain value;

computing at least one gain control metric being indicative of stability and output signal quality of the wireless repeater and generating a first gain setting value;

determining whether the first gain setting value indicates an increase or a decrease in a current gain value;

setting the gain value of the wireless repeater based on the first gain setting value in response to determining that the first gain setting value indicates the decrease in the current gain value; and determining one or more maximum signal headrooms associated with circuitry of the wireless repeater and setting the gain value of the wireless repeater based on the first gain setting value and not to exceed the one or more maximum signal headrooms associated with the circuitry of the wireless repeater in response to determining that the first gain setting value indicates the increase in the current gain value.

8. The method of claim 7, wherein determining one or more maximum signal headrooms associated with circuitry of the wireless repeater comprises:

cancelling the feedback signal from the receive signal to generate an echo cancelled signal;

computing a saturation metric using a power level of the echo cancelled signal; and computing the one or more maximum signal headrooms using the computed saturation metric value.

9. The method of claim 8, wherein computing the one or more maximum signal headrooms using the computed saturation metric value comprises:

determining a first maximum signal headroom associated with an analog-to-digital converter of the wireless repeater; and determining a second maximum signal headroom associated with a digital-to-analog converter of the wireless repeater.

10. The method of claim 9, wherein setting the gain value of the wireless repeater based on the first gain setting value and not to exceed the one or more maximum signal headrooms associated with the circuitry of the wireless repeater further comprises:

providing a maximum gain value for the wireless repeater;

assessing a maximum gain headroom based on the maximum gain value;

setting a wireless repeater headroom value as a minimum value of the maximum gain value, the first maximum signal headroom and the second maximum signal headroom; and setting the second gain setting value such that the wireless repeater headroom is non-negative.

11. The method of claim 7, further comprising:

determining a gain difference between an uplink transmission and a downlink transmission of the wireless repeater;

generating a third gain setting value indicative of the gain difference; and determining the gain value of the amplified signal based on the first, second, and third gain setting values, the gain value being selected to maintain the stability of the feedback loop of the wireless repeater, to not exceed the one or more maximum signal headrooms associated with the circuitry of the wireless repeater, and to maintain uplink and downlink transmission balance.

12. A computer readable medium having stored thereon computer executable instructions for performing at least the following acts:

receiving a receive signal at an antenna of a repeater;

generating an amplified signal, the amplified signal being amplified by a gain value;

computing at least one gain control metric being indicative of stability and output signal quality of the repeater and generating a first gain setting value;

determining whether the first gain setting value indicates an increase or a decrease in a current gain value;

setting the gain value of the repeater based on the first gain setting value in response to determining that the first gain setting value indicates the decrease in the current gain value; and determining one or more maximum signal headrooms associated with circuitry of the repeater and setting the gain value of the repeater based on the first gain setting value and not to exceed the one or more maximum signal headrooms associated with the circuitry of the repeater in response to determining that the first gain setting value indicates the increase in the current gain value.

13. A wireless repeater having a first antenna and a second antenna to receive a receive signal and transmit an amplified signal, the receive signal being a sum of a remote signal to be repeated and a feedback signal resulting from a feedback channel between the first antenna and the second antenna, the feedback channel thus forming a feedback loop between the first and second antennas, the wireless repeater comprising:

a repeater circuitry configured to receive the receive signal from one of the first and second antennas, and to amplify and transmit the amplified signal over the other one of the first and second antennas, the amplified signal being amplified by a gain value; and a gain management block configured to control the gain value of the wireless repeater based on a plurality of gain setting values, the gain management block being configured to compute at least one gain control metric being indicative of stability and output signal quality of the wireless repeater and generate a first gain setting value, and the gain management block further being configured to determine one or more maximum signal headrooms associated with circuitry of the wireless repeater and generating a second gain setting value, wherein the gain management block determines the gain value of the amplified signal based on the first and second gain setting values, the gain value being selected to maintain the stability of the feedback loop of the wireless repeater and to not exceed the one or more maximum signal headrooms associated with the circuitry of the wireless repeater.

14. The wireless repeater of claim 13, wherein the gain management block is configured to determine a first maximum signal headroom associated with an analog-to-digital converter of the wireless repeater and a second maximum signal headroom associated with a digital-to-analog converter of the wireless repeater, the gain management block further configured to generate the second gain setting value indicative of the first and second maximum signal headroom values.

15. The wireless repeater of claim 14, wherein the gain management block is further configured to provide a maximum gain value for the wireless repeater, to assess a maximum gain headroom based on the maximum gain, and to set a repeater headroom value as a minimum value of the maximum gain headroom, the first maximum signal headroom and the second maximum signal headroom, the gain management block setting the second gain setting value such that the repeater headroom value is non-negative.

16. The wireless repeater of claim 15, wherein the gain management block is configured to select the gain value based on the first and second gain setting values to maintain the stability of the feedback loop of the wireless repeater and to not exceed the repeater headroom value.

17. The wireless repeater of claim 13, wherein the gain management block is further configured to determine a gain difference between an uplink transmission and a downlink transmission of the wireless repeater, to generate a third gain setting value indicative of the gain difference, and to select the gain value of the amplified signal based on the first, second, and third gain setting values, the gain value being selected to maintain the stability of the feedback loop of the wireless repeater, to not exceed the one or more maximum signal headrooms associated with the circuitry of the wireless repeater, and to maintain uplink and downlink transmission balance.

18. A wireless repeater having a first antenna and a second antenna to receive a receive signal and transmit an amplified signal, the receive signal being a sum of a remote signal to be repeated and a feedback signal resulting from a feedback channel between the first antenna and the second antenna, the feedback channel thus forming a feedback loop between the first and second antennas, the wireless repeater comprising:

means for receiving the receive signal from one of the first and second antennas, and for amplifying and transmitting the amplified signal over the other one of the first and second antennas, the amplified signal being amplified by a gain value; and means for controlling the gain value of the wireless repeater based on a plurality of gain setting values, the means computing at least one gain control metric being indicative of stability and output signal quality of the wireless repeater and generating a first gain setting value, and further determining one or more maximum signal headrooms associated with circuitry of the wireless repeater and generating a second gain setting value, wherein the means for controlling the gain value determines the gain value of the amplified signal based on the first and second gain setting values, the gain value being selected to maintain the stability of the feedback loop of the wireless repeater and to not exceed the one or more maximum signal headrooms associated with the circuitry of the wireless repeater.

19. A wireless repeater having a first antenna and a second antenna to receive a receive signal and transmit an amplified signal, the receive signal being a sum of a remote signal to be repeated and a feedback signal resulting from a feedback channel between the first antenna and the second antenna, the feedback channel thus forming a feedback loop between the first and second antennas, the wireless repeater comprising:

a repeater circuitry configured to receive the receive signal from one of the first and second antennas, and to amplify and transmit the amplified signal over the other one of the first and second antennas, the amplified signal being amplified by a gain value; and a gain management block configured to control the gain value of the wireless repeater based on a plurality of gain setting values, the gain management block being configured to compute at least one gain control metric being indicative of stability and output signal quality of the repeater and generate a first gain setting value, and the gain management block being configured to determine whether the first gain setting value indicates an increase or a decrease in a current gain value, wherein the gain management block is configured to set the gain value of the wireless repeater based on the first gain setting value in response to the first gain setting value indicating the decrease in the current gain value; and wherein the gain management block is configured to determine one or more maximum signal headrooms associated with circuitry of the wireless repeater and to set the gain value of the wireless repeater based on the first gain setting value and not to exceed the one or more maximum signal headrooms associated with the circuitry of the wireless repeater in response to the first gain setting value indicating the increase in the current gain value.

20. The wireless repeater of claim 19, wherein the repeater circuitry is further configured to cancel the feedback signal from the receive signal to generate an echo cancelled signal and the gain management block is configured to compute a saturation metric using a power level of the echo cancelled signal and the gain management block is configured to determine the one or more maximum signal headrooms associated with circuitry of the wireless repeater using the computed saturation metric value.

21. The wireless repeater of claim 20, wherein the gain management block is configured to determine a first maximum signal headroom associated with an analog-to-digital converter of the wireless repeater and determine a second maximum signal headroom associated with a digital-to-analog converter of the wireless repeater.

22. The wireless repeater of claim 21, wherein the gain management block is further configured to provide a maximum gain value for the wireless repeater, to assess a maximum gain headroom based on the maximum gain, and to set a repeater headroom value as a minimum value of the maximum gain headroom, the first maximum signal headroom and the second maximum signal headroom, the gain management block setting the second gain setting value such that the repeater headroom value is non-negative.

23. The wireless repeater of claim 19, wherein the gain management block is further configured to determine a gain difference between an uplink transmission and a downlink transmission of the repeater, to generate a third gain setting value indicative of the gain difference, and to determine the gain value of the amplified signal based on the first, second, and third gain setting values, the gain value being selected to maintain the stability of the feedback loop of the wireless repeater, to not exceed the one or more maximum signal headrooms associated with the circuitry of the wireless repeater, and to maintain uplink and downlink transmission balance.

24. A wireless repeater having a first antenna and a second antenna to receive a receive signal and transmit an amplified signal, the receive signal being a sum of a remote signal to be repeated and a feedback signal resulting from a feedback channel between the first antenna and the second antenna, the feedback channel thus forming a feedback loop between the first and second antennas, the wireless repeater comprising:

means for receiving the receive signal from one of the first and second antennas, and for amplifying and transmitting the amplified signal over the other one of the first and second antennas, the amplified signal being amplified by a gain value; and means for controlling the gain value of the wireless repeater based on a plurality of gain setting values, the means computing at least one gain control metric being indicative of stability and output signal quality of the wireless repeater and generate a first gain setting value, and determining whether the first gain setting value indicates an increase or a decrease in a current gain value, wherein the means for controlling sets the gain value of the wireless repeater based on the first gain setting value in response to the first gain setting value indicating the decrease in the current gain value; and wherein the means for controlling determines one or more maximum signal headrooms associated with circuitry of the wireless repeater and sets the gain value of the repeater based on the first gain setting value and not to exceed the one or more maximum signal headrooms associated with the circuitry of the wireless repeater in response to the first gain setting value indicating the increase in the current gain value.

\* \* \* \* \*